(12) United States Patent
Muramatsu et al.

(10) Patent No.: US 6,679,486 B2
(45) Date of Patent: Jan. 20, 2004

(54) PNEUMATICALLY CONTROLLED VIBRATION DAMPER

(75) Inventors: Atsushi Muramatsu, Komaki (JP); Kazuhiko Kato, Komaki (JP); Motohiro Hatano, Kounan (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/062,609

(22) Filed: Jan. 30, 2002

(65) Prior Publication Data

US 2002/0109279 A1 Aug. 15, 2002

(30) Foreign Application Priority Data

Feb. 13, 2001 (JP) ........................................ 2001-036021

(51) Int. Cl.$^7$ ................................................ F16F 15/04
(52) U.S. Cl. .............................. 267/140.13; 267/140.14
(58) Field of Search ........................ 267/140.11, 140.13, 267/140.14, 140.15; 188/378, 379, 380

(56) References Cited

U.S. PATENT DOCUMENTS

| 5,314,173 | A | * | 5/1994 | Ide et al. ............... 267/140.14 |
| 5,427,362 | A | * | 6/1995 | Schilling et al. ....... 267/140.14 |
| 5,859,692 | A | * | 1/1999 | Ross, Jr. et al. ......... 267/64.19 |
| 5,941,512 | A | | 8/1999 | Muramatsu et al. |
| 5,967,269 | A | | 10/1999 | Kato |
| 6,055,317 | A | | 4/2000 | Muramatsu et al. |
| 6,059,275 | A | | 5/2000 | Muramatsu |
| 6,206,351 | B1 | * | 3/2001 | Hamada et al. ........ 267/140.14 |
| 6,264,181 | B1 | * | 7/2001 | Muramatsu et al. ... 267/140.14 |

FOREIGN PATENT DOCUMENTS

JP            10-169705            6/1998

* cited by examiner

Primary Examiner—Jack Lavinder
Assistant Examiner—Mariano Sy
(74) Attorney, Agent, or Firm—Beyer Weaver & Thomas, LLP

(57) ABSTRACT

A pneumatically controlled vibration damper that includes: an elastic connector disposed between and secured to a mounting member and a mass member for elastically connecting the mass member to the mounting member, and partially defining a working air chamber closed from an external area; an air passage connected to the working air chamber for regulating an air pressure in the working air chamber from the external area; and a static pressure-regulating system operable for substantially statically regulating the air pressure in the working air chamber via the air passage, so as to induce a substantially static elastic deformation of the elastic connector for changing a spring characteristic of the elastic connector.

11 Claims, 8 Drawing Sheets

PNEUMATICALLY CONTROLLED VIBRATION DAMPER

INCORPORATED BY REFERENCE

The disclosure of Japanese Patent Application No. 2001-036021 filed on Feb. 13, 2001 including the specification, drawings and abstract is incorporated herein by reference in its entirety.

BACKGROUND OF THE INVENTION

1. Field of the Invention

The present invention relates generally to vibration dampers to be attached to a subject member to damp vibration of the subject member, and more particularly to a pneumatically controlled vibration damper that is novel in construction and capable of regulating vibration damping characteristics thereof by utilizing pneumatic pressure, so that the vibration damper exhibits vibration damping effect corresponding to vibration to be damped.

2. Description of the Related Art

A dynamic damper of passive type is known as means for damping vibration excited in a subject member that is likely to be vibrated, such as a body of an automotive vehicle. The passive-type dynamic damper generally includes a mounting member to be attached to the subject member and a mass member elastically connected via an elastic support member so that the mass member is elastically supported by the mounting member. Recently, there have been proposed pneumatically operated active vibration dampers in an attempt to obtain an enhanced damping effect. A known example of such a pneumatically operated active vibration damper is disclosed in JP-A-10-169705, wherein a working air chamber is formed to apply oscillating force to the mass member on the basis of a change of an air pressure within the working air chamber, so that the mass member is positively oscillated to generate an oscillating force that acts on the subject member to offset or actively damp vibration excited in the subject member.

As well known in the art, the mass member and the elastic support member constitute a single vibration system that serves as a secondary vibration system with respect to the subject member served as a primary vibration system. In order to obtain an excellent vibration damping effect, these conventional passive-type and active-type vibration dampers may advantageously utilize resonance of their vibration systems constituted by the mass member and the elastic support member. For this reason, it is desirable to tune a natural frequency of the vibration system to a frequency band of vibration to be damped.

However, such conventional vibration dampers of passive type and active type may suffer from an inherent problem. Namely, since the natural frequency of the vibration system constituted by the mass member and the elastic support member is fixedly determined by a mass of the mass member and a spring constant of the elastic support member, the natural frequency of the vibration system is likely to deviate from the frequency band of the vibration to be damped, when the vibration to be damped varies. Thus, the conventional vibration dampers do not necessarily exhibit an excellent vibration damping effect with respect to vibrations having a plurality of frequency bands or over a wide frequency range.

SUMMARY OF THE INVENTION

It is therefore one object of the invention to provide a vibration damper that is novel in construction, and that is capable of controlling vibration damping characteristics thereof and exhibiting an excellent vibration damping effect with respect to vibrations having a plurality of frequency bands or over a wide frequency range.

It is another object of the present invention to provide a vibration damper that is simple in construction and compact in size, and that eliminates a need for assembling a specific actuator therein.

The above objects may be attained according to the following modes of the invention, each of which is numbered like the appended claims and depends from the other mode or modes, where appropriate, to indicate possible combinations of elements or technical features of the invention. It is to be understood that the present invention is not limited to the following modes or combinations of technical features, but may otherwise be recognized based on a principle of the present invention that described in the whole specification and drawings, or may be recognized by those skilled in the art in the light of the disclosure in the whole specification and drawings.

(1) A pneumatically controlled vibration damper for damping vibration of a subject member as a primary vibration system, the vibration damper including: (a) a mounting member adapted to be fixed to the subject member; (b) a mass member disposed spaced apart from the mounting member and displaceable relative to the mounting member; (c) an elastic connector secured to the mounting member and the mass member for elastically connecting the mass member to the mounting member so that the elastic connector and the mass member cooperate to form a secondary vibration system; (d) a working air chamber partially defined by the elastic connector and closed from an external area; (e) an air passage connected to said working air chamber for regulating an air pressure in the working air chamber from said external area; and (f) a static pressure-regulating system operable for substantially statically regulating the air pressure in the working air chamber via the air passage, so as to induce a substantially static elastic deformation of the elastic connector for changing a spring characteristic of the elastic connector.

In the pneumatically controlled vibration damper constructed according to this mode of the invention, the air pressure in the working air chamber is statically changed so as to change the spring characteristic of the elastic connector. This makes it possible to change a natural frequency of a vibration system of the vibration damper that is constituted by the mass member as a mass component and the elastic connector as a spring component, and that serves as the secondary vibration system. Described in detail, the vibration damper may be arranged by way of example such that an amount of statically elastic deformation of the elastic connector is made smaller, as the pressure of the air in the working air chamber is made closer to the atmospheric pressure, resulting in a soft spring characteristic of the elastic connector. Thus, the natural frequency of the vibration system of the vibration damper is tuned to a low frequency band, for example. Namely, the vibration damper of this mode of the invention is capable of controlling a static air pressure in the working air chamber, making it possible to tune or change the natural frequency of the vibration system constituted by the mass member and the elastic connector so as to correspond to a frequency of the vibration to be damped, even in the case where the frequency of the vibration to be damped varies. Thus, the vibration damper of this mode of the invention is capable of exhibiting an excellent passive or active vibration damping effect with the help of a resonance of the vibration system of the vibration damper (i.e., the secondary vibration system).

Further, the spring characteristic of the elastic connector can be suitably changed or determined according to a substantially static pressure value applied to the working air chamber. This arrangement makes it possible to suitably adjust the spring characteristic of the elastic connector so as to correspond to the change of the frequency of the vibration to be damped. Therefore, the vibration damper of the present mode of the invention is capable of efficiently exhibiting an excellent vibration damping effect with respect to input vibration in a plurality of frequency bands or over a wide frequency range, because of the resonance effect of the vibration system constituted by the mass member and the elastic connector.

It should be appreciated that the phrase "substantially static elastic deformation" of the elastic connector is interpreted to mean a state of the elastic deformation of the elastic connector in which the elastic connector is able to be held in a substantially constant attitude, provided no dynamic or periodic change of the air pressure in the working air chamber is taken into account, which is induced by means of another system, such as a dynamic pressure-regulating system that will be described later. For instance, there is a case where the elastic connector undergoes its elastic deformation whose amount slightly continuously varies, and the variation in the amount of the elastic deformation of the elastic connector is small enough to ignore with respect to an amount of oscillating displacement of the elastic connector induced upon application of a vibrational load to the vibration damper or upon application of an active dynamic or periodic air pressure change to the working air chamber by means of the dynamic pressure-regulating system. In this case, such a slight variation in the amount of elastic deformation of the elastic connector needs not to be taken into account, so that it can be considered that the elastic connector undergo substantially static elastic deformation. Further, the static pressure-regulating system of the vibration damper of this mode of the invention is able to bring the elastic connector into a variety of states of its substantially static elastic deformation including its initial state, by applying substantially static air pressure of different levels to the working air chamber. In this respect, the substantially static air pressure applied to the working air chamber includes a dynamic or periodic air pressure change at a significantly high frequency in comparison with frequencies of vibration to be damped and frequencies of the dynamic air pressure change applied to the working air chamber by means of the dynamic pressure-regulating system. Namely, if such a dynamic air pressure change having the significantly high frequency is applied to the working air chamber, the elastic connector is not able to be elastically deformed according to the dynamic or periodic air pressure change induced in the working air chamber, resulting in the substantially static elastic deformation of the elastic connector. In the case where the static pressure-regulating system is operated to apply the dynamic air pressure change having the significantly high frequency to the working air chamber, as described above, it is further possible to regulate the level of the substantially static air pressure applied to the working air chamber, in other words, the spring characteristic of the elastic connector, by suitably regulating a duty ratio of the dynamic or air pressure change, for example.

According to the present mode (1) of the invention, the air pressure in the working air chamber is substantially statically regulated for permitting a static change of the spring characteristic of the elastic connector. This air pressure in the working air chamber may be statically regulated by alternately exposing or connecting the working air chamber to the atmosphere and a negative or positive pressure having a given constant value, or alternatively by changing the air pressure in the working air chamber among a plurality of given different pressure values or among suitable pressure values selected from continuously changing pressure values. A material for the elastic connector employed in the vibration damper of this mode of the invention may preferably be selected from the group consisting of various kinds of known rubber materials, elastomers, composite materials consisting of a rubber material and a canvas or a synthetic resin material. The shape, size and material of the elastic connector may be desirably determined taking into account a required characteristic of the elastic connector and the shapes of the mounting member and the mass member.

(2) A pneumatically controlled vibration damper according to the above mode (1), wherein the static pressure-regulating system is operable to substantially statically change the air pressure in the working air chamber by applying a substantially static air pressure having a pressure value selected from a predetermined range according to a frequency of the vibration to be damped so that a spring characteristic of the elastic connector become harder as a frequency of the vibration to be damped become higher. According to this mode of the invention, a natural frequency of the secondary vibration system, i.e., a vibration system of the vibration damper is made higher as the frequency of the vibration to be damped becomes higher. Thus, the vibration damper of this mode of the invention is capable of exhibiting an excellent active or passive vibration damping effect with the help of resonance effect of the secondary vibration system.

(3) A pneumatically controlled vibration damper according to the above-indicated mode (1) or (2), wherein the static pressure-regulating system is operable to apply to the working air chamber a substantially static air pressure whose value is changed between or among a predetermined different static pressure values according to a change in a frequency of the vibration to be damped so that the spring characteristic of the elastic connector is gradually changed. In the vibration damper constructed according to this mode of the invention, the natural frequency of the vibration system can be changed with high accuracy so as to follow the change in the frequency of the vibration to be damped, Thus, the vibration damper of this mode of the invention is able to exhibit a high vibration damping effect by effectively utilizing resonance of the vibration system thereof (i.e., the secondary vibration system).

(4) A pneumatically controlled vibration damper according to any one of the above-indicated modes (1)–(3), further comprising at least one abutting projection formed on an inner surface of the working air chamber such that the at least one abutting projection protrudes at least from one toward an other of said elastic connector and an abutting portion of said inner surface of said working air chamber, said working air chamber being opposed to the elastic connector, wherein the static pressure-regulating system is operable to regulate the air pressure in the working air chamber so that the abutting projection is brought into abutting contact with the elastic connector or the abutting portion of said inner surface of said working air chamber for applying a restricting force to the elastic connector. In the vibration damper according to this mode of the invention, the at least one abutting projection may be alternately brought into two operating states, namely an abutting state where the abutting projection is held in abutting contact with the elastic connector or the abutting portion of the inner surface of the working air chamber, and a non-abutting state where the abutting projection is spaced apart from the elastic connector or the abutting portion of the inner surface of the working air chamber, thereby alternatively providing a restricted or a non-restricted state of the elastic connector, for example. This arrangement makes it possible to change greatly and clearly the spring characteristic of the elastic connector with high stability.

The abutting projection may be arranged such that the abutting projection is brought into abutting contact with the elastic connector or the abutting portion of the inner surface of the working air chamber with a contact area that gradually increases with an increase in an amount of elastic deformation of the elastic connector. This arrangement makes it possible to gradually change the spring characteristic of the elastic connector by gradually increasing the restricting force applied to the elastic connector by means of the abutting projection, for example. Preferably, the abutting projection is disposed coaxially or concentrically with the elastic connector, and extends continuously or discontinuously about an elastic center axis of the elastic connector so as to be formed in a generally annular shape. This allows the elastic connector to be elastically deformed with high stability, when the abutting projection is held in its abutting state, whereby the elastic connector exhibits its desired spring characteristic with high stability.

(5) A pneumatically controlled vibration damper according to any one of the above-indicated modes (1)–(4), wherein the mounting member and the mass member are opposed to and spaced apart from each other in a vibration input direction in which the vibration damper primary receives a vibrational load to be damped, wherein the elastic connector comprises a connecting elastic body that extends outwardly from the mounting member in a direction perpendicular to the vibration input direction and is bonded at an outer peripheral portion thereof to the mass member so that the connecting elastic body primary undergoes shear deformation thereof upon a displacement of the mass member in the vibration input direction, and wherein the working air chamber is disposed between a surface of the mass member and a surface of the connecting elastic body that is opposed to the surface of the mass member in the vibration input direction. In the vibration damper according to this mode of the invention, the connecting elastic body is disposed in the vibration damper with its principle elastic axis conforming to the vibration input direction in which the vibrational load to be damped is applied, thereby increasing a spring ratio of the connecting elastic body. This arrangement enables a stable oscillation of the mass member in the vibration input direction, so that the vibration damper of this mode of the invention exhibits a desired vibration damping effect with high stability.

(6) A pneumatically controlled vibration damper according to any one of the above-indicated modes (1)–(5), wherein said air passage is formed through said mounting member. This arrangement makes it possible to fixedly form the air passage for applying a suitable air pressure to the working air chamber through the mounting member with simple structure and with effective utilization of the mounting member.

(7) A pneumatically controlled vibration damper according to any one of the above-indicated modes (1)–(6), wherein the vibration damper is applied to a vibration damper for an automotive vehicle, and a natural frequency of the secondary vibration system constituted by the elastic connector and the mass member is tuned to a low frequency band corresponding to engine idling vibration when the static pressure-regulating system operates to apply an atmospheric pressure to the working air chamber, and to a high frequency band corresponding to booming noises when the static pressure-regulating system operates to apply a static air pressure other than the atmospheric pressure to the working air chamber. The vibration damper according to this mode of the invention is capable of exhibiting excellent vibration damping effects with respect to both of the idling vibration to be damped during an idling condition of the vehicle and the booming noises to be damped during a running condition of the vehicle.

(8) A pneumatically controlled vibration damper according to any one of the above-indicated modes (1)–(7), further comprising a dynamic pressure-regulating system that is operable to apply to the working air chamber a dynamic or periodic air pressure change having a frequency corresponding to a frequency of the vibration to be damped, so as to actively oscillate the mass member. In the vibration damper according to this mode of the invention, the mass member may be actively or positively oscillated at the frequency corresponding to the frequency of the vibration to be damped, by dynamically changing the air pressure in the working air chamber at the frequency corresponding to the frequency of the vibration to be damped. As a result, the oscillating movement of the mass member acts to offset or positively damp the vibration to be damped excited in the subject member. Thus, the vibration damper of this mode of the invention is capable of effectively exhibiting an active vibration damping effect with respect to vibration to be damped.

It is noted that the pneumatically controlled vibration damper of this mode of the invention is capable of changing the natural frequency of its vibration system including the mass member (i.e., the secondary vibration system) so as to correspond to the frequency of the vibration to be damped, by using the static pressure-regulating system. That is, the vibration damper of this mode is capable of effectively generating the oscillating movement of the mass member at a plurality of frequency bands or over a wide frequency range by means of the dynamic pressure-regulating system, with the help of resonance effect of the vibration system. Thus, the vibration damper of this mode of the invention is capable of exhibiting the active vibration damping effect with respect to the plurality of frequency bands or over the wide frequency range.

The dynamic pressure-regulating system may be effectively embodied by alternately connecting the working air chamber to two external air sources having different pressure values at a frequency corresponding to the frequency of the vibration to be damped. Preferably, the atmosphere is used as one of the two air sources, thus simplifying the structure of the dynamic pressure-regulating system.

(9) A pneumatically controlled vibration damper according to the above-indicated mode (8), wherein the dynamic air pressure change generated by the dynamic pressure-regulating system is applied to the working air chamber together with a substantially static air pressure change generated by the static pressure-regulating system. In the vibration damper according to this mode of the invention, both of the dynamic air pressure change and the static air pressure change can be applied to the working air chamber through the same air passage, thus simplifying the structure of an air piping system including the air passage. Preferably, the static and dynamic air pressure-regulating systems commonly utilize at least one same air source, thus further simplifying the overall air piping system including the air sources.

(10) A pneumatically controlled vibration damper according to the above-indicated mode (8) or (9), wherein the dynamic pressure-regulating system includes a first switch valve operable for alternately connecting the working air chamber to a vacuum source and the atmosphere at a frequency corresponding to a frequency of the vibration to be damped, and a first duty ratio regulating system operable for regulating a duty ratio of a control signal applied to the first switch valve according to the vibration to be damped, the first duty ratio regulating system changing a ratio of a time of connection of the working air chamber to the vacuum source, to a period of a switching operation of the first switch valve so as to regulate an amplitude of the dynamic air pressure change having the frequency corresponding to the frequency of the vibration to be damped, which is applied to the working air chamber. The vibration damper according to this mode of the invention is capable of applying to the working air chamber the dynamic or periodic air pressure change whose frequency and amplitude are easily and sophisticatedly controlled so as to corresponds to those of the vibration to be damped. Thus, the vibration damper of this mode is able to exhibit a further improved active vibration damping effect with respect to vibration to be damped.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
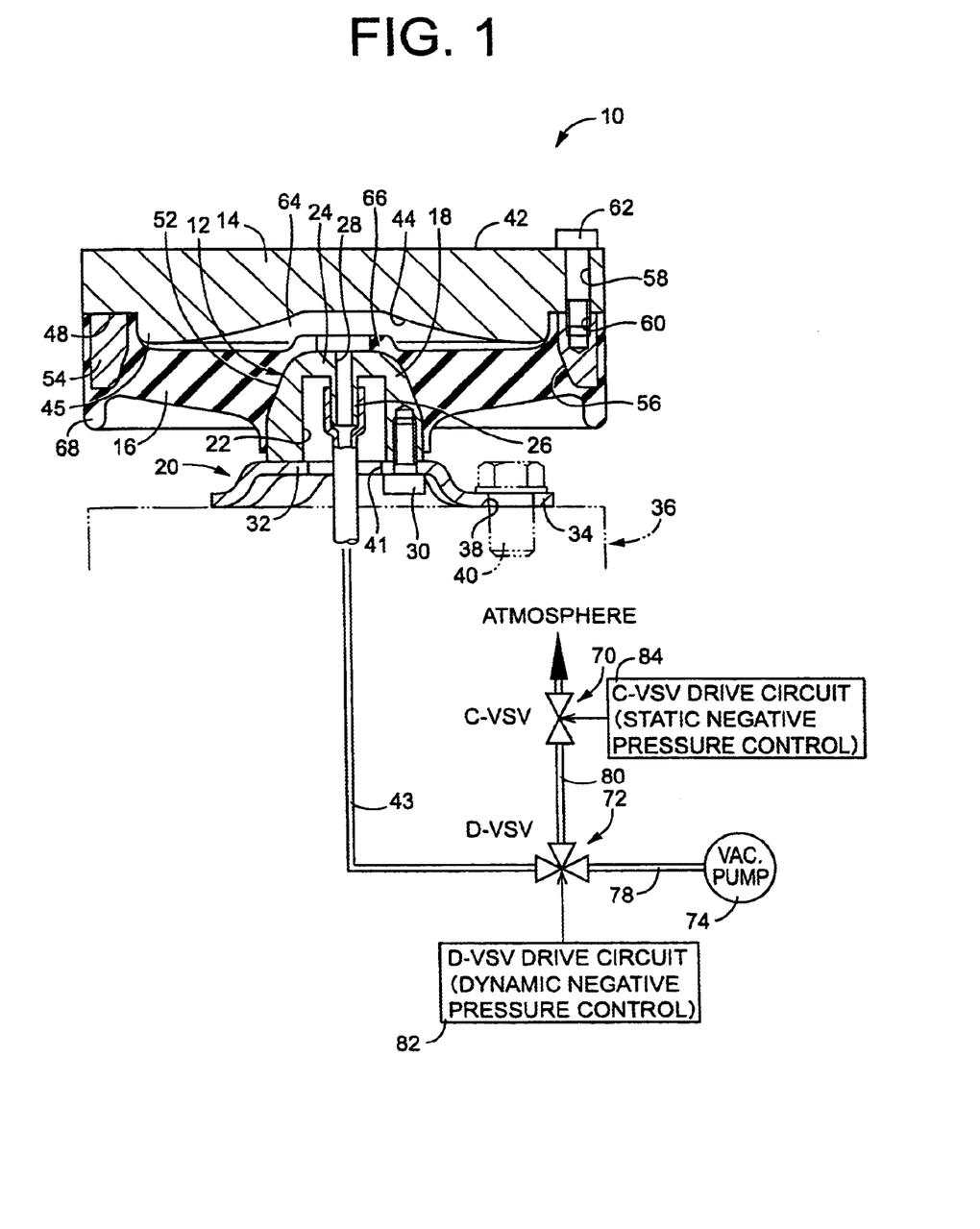
FIG. 1 is an elevational view in vertical cross section of a pneumatically controlled vibration damper in the form of an active vibration damper constructed according to a first embodiment of the invention where the active vibration damper is in one operating state.

Referring first to FIG. 1, there is schematically shown an active vibration damper 10 for an automotive vehicle, which is constructed according to a first embodiment of a pneumatically controlled vibration damper of the invention, together with a drive system used for driving the active vibration damper 10. The active vibration damper 10 includes a mounting member 12 and a mass member 14 both made of metallic materials, and an elastic connector in the form of a connecting elastic body 16 made of a rubber material. The connecting elastic body 16 is secured to and elastically connects the mounting member 12 and the mass member 14 so that the mass member 14 is elastically supported by the mounting member 12 via the connecting elastic body 16. The mounting member 12 and the mass member 14 are displaceable relative to each other in a vertical direction as seen in FIG. 1 in which a primary vibrational load to be damped by the present active vibration damper 10 is applied thereto.

More specifically described, the mounting member 12 includes a body member 18 and a fixing plate 20, which are both made of a rigid metallic materials such as steel and fixed together by means of bolts. The body member 18 is a thick-walled inverted cup shaped member in its entirety. The body member 18 has a tapered profile and a central recess 22 open in its bottom surface as seen in FIG. 1. The body member 18 further includes a tubular port 26 that is integrally formed at a central portion of a top wall 24 of the body member 18, so as to extend downwardly along a center axis of the body member 18. This port 26 has a bore whose axially upper end is open in an upper surface of the top wall 24, thereby serving as an air passage 28.

The fixing plate 20 is a generally annular plate-like member that includes an central annular plate portion 32 and a plurality of fixing plate portion 34 integrally formed at respective circumferential portions of an outer circumference of the central annular plate portion 32 so as to extend radially outwardly. The fixing plate 20 is firmly fixed to the body member 18 with its central annular plate portion 32 superposed on and fixed to the bottom surface of the body member 18 by means of a plurality of bolts 30, so that the fixing plate 20 extends in a radial direction perpendicular to the center axis of the body member 18. Each of the fixing plate portion 34 is bent axially downwardly at its radially intermediate portion as seen in FIG. 1 so that the fixing plate portion 34 protrudes axially downwardly from the central annular plate portion 32 by a given axial distance. The fixing plate portion 34 are superposed on a subject member exciting vibration to be damped, namely a vibrative member 36 of the vehicle, such as a body of the vehicle in the present embodiment, and is fixed to the vibrative member 36 by means of fixing bolts 40 extending through fixing holes 38 formed through respective fixing plate portion 34. That is, the mounting member 12 is firmly fixed to the vibrative member 36 with its fixing plate 20 bolted to the vibrative member 36 as described above.

The central annular plate portion 32 of the fixing plate 20 has a central through hole 41. As shown in FIG. 1, the presence of the central through hole 41 permits that an external air conduit 43 extends through the central recess 22 of the body member 18 and communicates with the port 26 protruding from the top wall 24 of the body member 18.

On the other hand, the mass member 14 is a generally circular block-like member or a generally circular thick-walled plate-like member in its entirety, and is made of a high gravity material such as steel. The mass member 14 has a diameter that is made sufficiently larger than outer diameters of the body member 18 and the fixing plate 20 of the mounting member 12. The mass member 14 is disposed coaxially with the mounting member 12 with a suitable radial spacing therebetween and with a horizontal position. An upper surface 42 of the mass member 14 is made flat, while a lower surface of the mass member 14 has an abutting portion in the form of a large-diameter recess 44 having a generally inverted shallow mortar shape.

More specifically, the large-diameter recess 44 has an inner surface that extends radially outwardly from its bottom portion toward its open end portion. Further, a gradient of the inner surface of the large-diameter recess 44 with respect to a center axis of the mass member 14 varies in the axial direction so that the inner surface slightly inwardly protrudes at its axially intermediate portion as shown in FIG. 1. The large-diameter recess 44 constitutes at its outer circumferential open-end portion an annular abutting projection 45 protruding toward the connecting elastic body 16. This annular abutting projection 45 is brought into abutting contact with the connecting elastic body 16, when a working air chamber 64 is exposed to a given negative pressure, which will be described later, to thereby apply a restricting force to the connecting elastic body 16.

The mass member 14 has a fixing cutout 48 formed its axially lower peripheral portion and extending in its circumferential direction over its entire circumference, as seen in FIG. 1. The fixing cutout 48 is disposed radially outward of the large-diameter recess 44 so as to adjacent to the open-end portion of the large-diameter recess 44.

The connecting elastic body 16 is disposed between the mounting member 12 and the mass member 14, which are disposed coaxially with each other with the given axial spacing therebetween. The connecting elastic body 16 has a generally thick-walled annular plate shape in its entirety. The connecting elastic body 16 is also disposed coaxially with the mounting member 12 and the mass member 14 so as to extend radially outwardly. The wall-thickness of the connecting elastic body 16 is gradually decreases with an increase of a radial distance from its center axis. The connecting elastic body 16 extends radially outwardly with a slight gradient with respect to its center axis, such that the connecting elastic body 16 extends radially outwardly and axially upwardly in its free condition where no load is applied to the connecting elastic body 16. In this arrangement, the connecting elastic body 16 has its elastic center that extends in a diametric direction thereof while being slightly inclined axially upwardly with respect to a center axis thereof.

The thus formed connecting elastic body 16 is secured at its inner circumferential surface to a tapered outer circumferential surface 52 of the body member 18 of the mounting member 12, in the process of vulcanization of a rubber material for forming the connecting elastic body 16. Thus, the connecting elastic body 16 extends radially outwardly from the body member 18. Further, the connecting elastic body 16 is secured at its outer circumferential surface to a metallic connecting ring 54 having a large diameter cylindrical or annular shape and disposed radially outward of the connecting elastic body 16, in the above-indicated vulcanization process. It is noted that, the outer circumferential surface of the connecting elastic body 16 is firmly secured to the connecting ring 54 over its entire axial length, and the connecting ring 54 has an inner circumferential surface 56 whose diameter gradually decreases in the axially upward direction, so that the inner circumferential surface 56 extends generally parallel to the tapered outer circumferential surface 52 of the body member 18 with a given radial spacing therebetween.

The connecting ring 54 has an axially upper end portion that protrudes axially upwardly by a given axial distance from the connecting elastic body 16 as seen in FIG. 1. This axially upper end portion of the connecting ring 54 is fitted onto the fixing cutout 48 of the mass member 14 in the axial and radial directions of the mass member 14. The mass member 14 has a plurality of through holes 58 formed at respective outer circumferential portions thereof and extending thereof through in its axial direction for receiving connecting bolts 62 respectively. On the other hand, the connecting ring 54 has a plurality of tapped holes 60 open in its upper end face and formed at respective circumferential portions corresponding to the through holes 58 of the mass member 14. The connecting bolts 62 extending through respective through holes 58 are screwed into the tapped holes 60, respectively, whereby the mass member 14 and the connecting ring 54 are firmly bolted together.

With the mass member 14 and the connecting ring 54 fixed together as described above, the mounting member 12, the mass member 14 and the connecting elastic body 16 are disposed coaxially with one another, while the mounting member 12 and the mass member 14 are elastically connected to each other via the connecting elastic body 16. Since the connecting elastic body 16 extends generally perpendicular to a center axis of these members 12, 14, 16 extending parallel to the vibration input direction, the connecting elastic body 16 undergoes shear deformation upon oscillation of the mass member 14. In this condition, the connecting elastic body 16 fluid-tightly closes an opening of the large-diameter recess 44 formed in the lower surface of the mass member 14, thereby forming a closed working air chamber 64 defined by and between the mass member 14 and the connecting elastic body 16. In an initial state of the active vibration damper 10 as shown in FIG. 1, where the connecting elastic body 16 receives a static load or weight of the mass member 14 only, the working air chamber 64 extends over a substantially entire area of the large-diameter recess 44 and a central portion of the upper surface of the connecting elastic body 16 that is opposed to the large-diameter recess 44 in the axial direction. Due to the shape of the large-diameter recess 44, the working air chamber 64 has an axial dimension (i.e., a vertical dimension as seen in FIG. 1) that is maximized at its radially central portion and gradually decreases with an increase of a radial distance from its radially central portion.

The working air chamber 64 is held in fluid communication with the air passage 28 one of opposite end of which is open in the upper surface of the top wall 24 of the body member 18 of the mounting member 12. Accordingly, a suitable air pressure applied through the external air conduit 43 is introduced into the working air chamber through the air passage 28.

Meanwhile, an abutting projection in the form of an elastic projection 66 is secured to an outer circumferential surface of the upper surface of the top wall 24 of the body member 18. Namely, the elastic projection 66 is disposed around the opening of the air passage 28 on the upper surface of the top wall 24. This elastic projection 66 is brought into abutting contact with the mass member 14, for thereby elastically limiting an amount of displacement of the mass member 14 toward the mounting member 12 is elastically limited. Further, an elastic stopper projection 68 is secured to the axially lower end face of the connecting ring 54, which is bolted to the mass member 14. The stopper projection 68 is brought into abutting contact with the vibrative member 36, for thereby elastically limiting an amount of displacement of the mass member 14 toward the vibrative member 36 in the axial direction (i.e., in the vertical direction as seen in FIG. 1). In the present embodiment, the elastic projection 66 and the elastic stopper projection 68 is integrally formed with the connecting elastic body 16.

Hence, the active vibration damper 10 constructed as described above is installed on the vibrative member 36 such that a common center axis of the mounting member 12, the mass member 14 and the connecting elastic body 16 extends in the vertical direction as seen in FIG. 1.

With the active vibration damper 10 installed on vibrative member 36 as described above, the port 26 that is held in fluid communication with the working air chamber 64 is connected to a first switch valve in the form of a dynamic pressure-regulating value (D-VSV) 72 via the external conduit 43. In the present embodiment, the dynamic pressure-regulating valve (D-VSV) 72 may consist of a three-port (three-way) solenoid-operated switch valve of spool or rotary type. The dynamic pressure-regulating valve (D-VSV) 72 has a vacuum position for connecting the working air chamber 64 to a vacuum source 74 through a first branch conduit 78, and an atmospheric position for connecting the working air chamber 64 to the atmosphere through a second branch conduit 80. Further, a second switch valve in the form of a static pressure-regulating valve (C-VSV) 70 is disposed at a portion of the second branch conduit 80, so that the second branch conduit 80 is connected to the atmosphere through the static pressure-regulating valve (C-VSV) 70. In the present embodiment, the static pressure-regulating valve (C-VSV) 70 may consist of a two-port (two-way) solenoid-operated switch valve of spool or rotary type.

The vacuum source 74 may be constituted by utilizing negative pressure available from an air intake system of an internal combustion engine of the vehicle, for example. In this respect, a suitable accumulator may be employed for accumulating the negative pressure available from the air intake system, for thereby providing the negative pressure with a stabilized pressure value.

The switching operations of the dynamic pressure-regulating valve 72 and the static pressure-regulating valve 70 are suitably controlled by a D-VSV drive circuit 82 as a first duty ratio regulating system and a C-VSV drive circuit 84 as a second duty ratio regulating system, respectively, so that the air pressure in the working air chamber 64 is controlled according to vibration to be damped. More specifically, the D-VSV drive circuit 82 and the C-VSV drive circuit 84 are adapted to receive at least one output signals that have co-relationship with vibration condition of the vehicle, such as an engine ignition pulse signal, a running speed signal, an engine speed signal, an acceleration signal. On the basis of the received control signal(s), the D-VSV drive circuit 82 and the C-VSV drive circuit 84 then output control signals in the form of the drive currents to the dynamic pressure-regulating valve 72 and the static pressure-regulating valve 70 so as to suitably operate the respective valves 72, 70.

Described in detail, the D-VSV drive circuit 82 receives the engine ignition pulse signal as a reference signal, and the engine speed signal as a compensation signal, for example. The D-VSV drive circuit 82 generates to the dynamic pressure-regulating valve 72 a drive signal that is obtained according to stored calculation program or selected from a predetermined data map on the basis of the engine ignition pulse signal and the engine speed signal. Namely, the drive signal generated from the D-VSV drive circuit 82 and applied to the dynamic pressure-regulating valve 72 has a frequency substantially equal to the engine ignition pulse signal, and a phase adjusted with respect to the engine ignition pulse signal so as to correspond to the engine speed. Upon application of the drive current to the dynamic pressure-receiving valve 72, the dynamic pressure-regulating valve 72 is alternately placed in the above-indicated vacuum and atmospheric positions at a frequency that is substantially equal to that of the engine ignition pulse signal and with a phase corresponding to that of the engine speed. As a result, the air pressure in the working air chamber 64 is dynamically changed according to the operating condition of the engine, and the mass member 14 is actively or positively oscillated due to the elastic deformation of the connecting elastic body 16, thus generating a desired oscillating force corresponding to vibration to be damped.

This oscillating force actively generated by the active vibration damper 10 acts on the vibrative member 36 so as to offset or attenuate vibration to be damped excited in the vibrative member 36. Hence, the active vibration damper 10 exhibits active vibration damping effect with respect to the vibration excited in the vibrative member 36.

On the other hand, the C-VSV drive circuit 84 generates to the static pressure-regulating valve 70 a drive signal that is obtained on the basis of a driving condition of the vehicle that is selected from a running condition and an idling condition on the basis of the vehicle speed signal. The static pressure-regulating valve 70 is operated according to the driving signal so that a pressure of the air applied from the second branch conduit 80 to the working air chamber 64 via the dynamic pressure-regulating valve 72 is suitably adjusted. Described in detail, the static pressure-regulating valve 70 has two operating positions, namely, an open and a closed position. During the dynamic pressure-regulating valve 72 is switched between the vacuum and atmospheric positions at a controlled frequency corresponding to that of the engine ignition pulse signal, the static pressure-regulating valve 70 is continuously switched under control of the C-VSV drive circuit 84 between the two operating positions, namely is alternately opened and closed at a frequency that is sufficiently higher than that of the controlled frequency of the switching operation of the dynamic pressure-regulating valve 72. At the same time, the switching operation of the static pressure-regulating valve 70 is further regulated according to a duty ratio control (PWM), or alternatively a frequency control (FM). The above-described control of the switching operation of the static pressure-regulating valve 70 makes it possible to desirably select a value of the air pressure applied from the second branch conduit 80 to the working air chamber 64 via the dynamic pressure-regulating valve 72 from a predetermined range between the negative pressure value of the vacuum source 74 and the atmospheric pressure.

Figure 2:
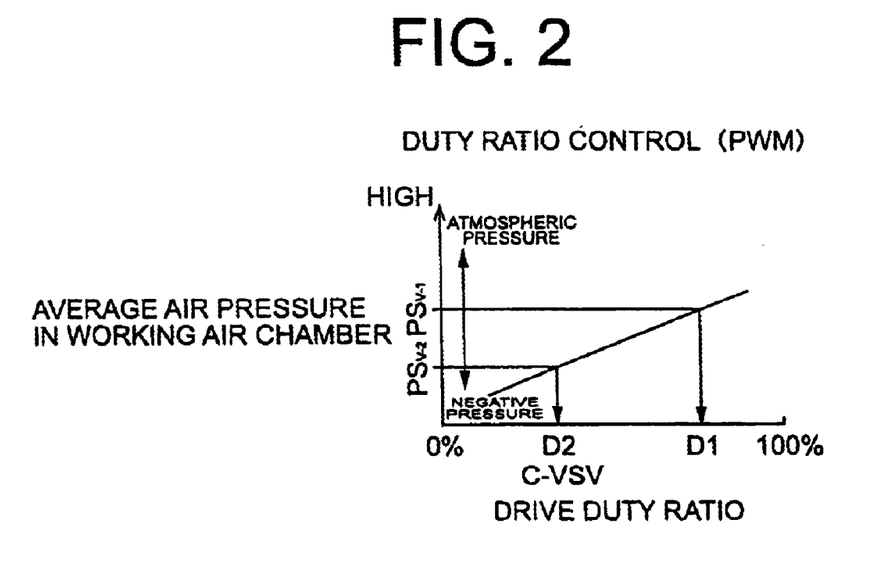
FIG. 2 is a graph suitable for explaining an example of a manner of static pressure control in the active vibration damper of FIG. 1.

A graph of FIG. 2 demonstrates a change of the air pressure applied to the working air chamber 64 through the second branch conduit 80, when it is changed a ratio of a time in which the static pressure-regulating valve 70 is held in its open position, i.e., is held in communication with the atmosphere, to a period of the switching operation of the switch valve (C-VSV drive duty), under the condition where the dynamic pressure-regulating valve 72 is switched at a constant frequency. That is, a suitable adjustment of the duty ratio of the static-pressure valve 70 makes it possible to adjust the pressure of the air applied to the working air chamber 64 through the second branch conduit 80, and adjust an average air pressure value of the pressure variation induced in the working air chamber 64 by the switching operation of the dynamic pressure-regulating valve 72, i.e., a static pressure in the working air chamber 64. A graph of fig. 3 demonstrate that a suitable adjustment of a frequency of the switching operation of the static-pressure-regulating valve 70 (C-VSV drive frequency) makes it possible to adjust the static pressure applied to the working air chamber 64, likewise.

Figure 3:
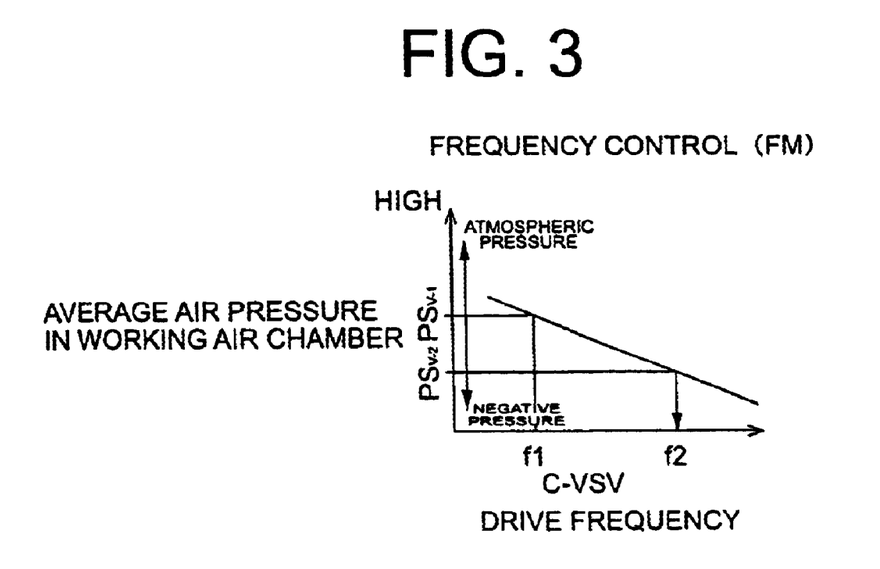
FIG. 3 is a graph suitable for explaining another example of a manner of the static pressure control in the active vibration damper of FIG. 1.
Figure 4:
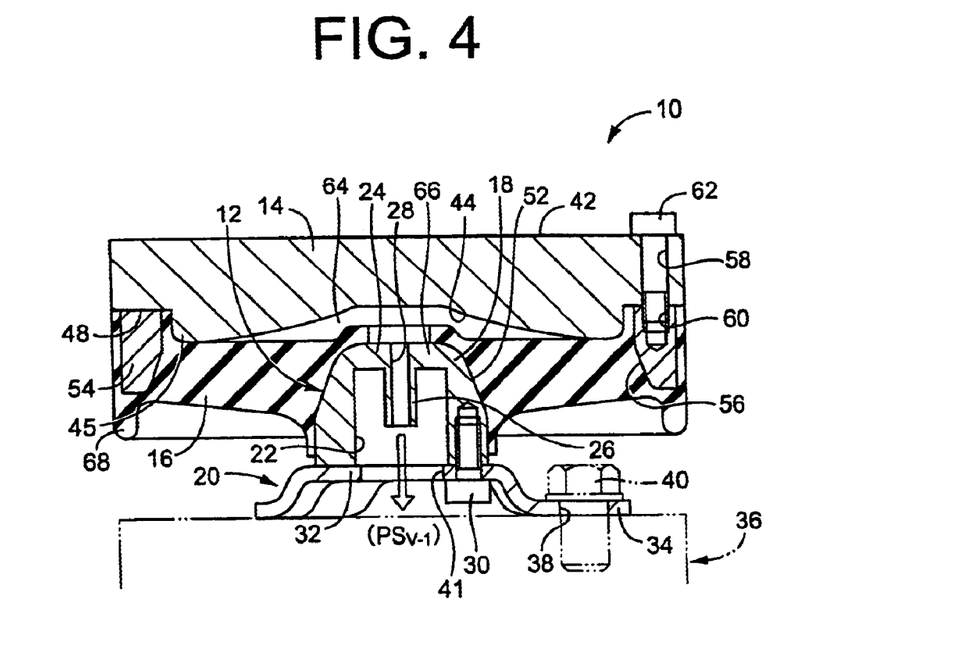
FIG. 4 is an elevational view in vertical cross section of the active vibration damper of FIG. 1 where the active vibration damper is in another operating state.

As is understood from FIGS. 2 and 3, if the static pressure-regulating valve 70 is controlled with the duty ratio D1 or the drive frequency f1, it allows the working air chamber 64 to have an average air pressure PSv-1, which is smaller than the atmospheric pressure. As shown in FIG. 4, when the working air chamber 64 is exposed to the average air pressure PSv-1, the volume of the working air chamber 64 is made smaller in comparison with the case where the working air chamber 64 is exposed to the atmosphere as shown in FIG. 1. As a result, the connecting elastic body 16 is partially restricted with its outer peripheral portion being held in contact with the abutting projection 45 of the mass member 14, making the natural frequency of the vibration system consisting of the mass member 14 and the connecting elastic body 16 higher in comparison with the case where the working air chamber 64 is exposed to the atmosphere as shown in FIG. 1.

Figure 5:
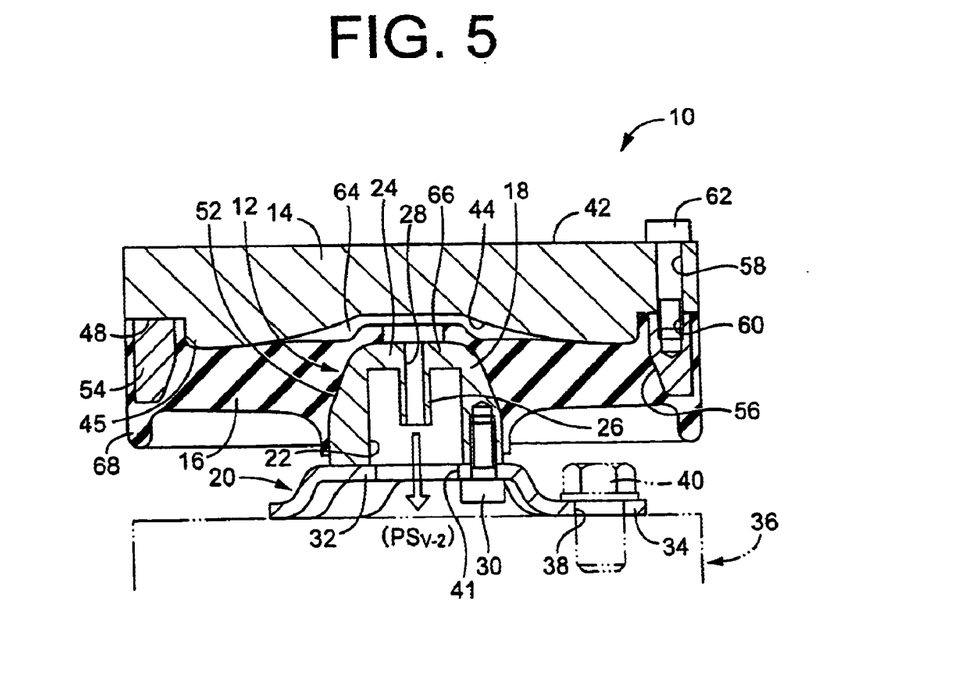
FIG. 5 is an elevational view in vertical cross section of the active vibration damper of FIG. 1 where the active vibration damper is in yet another operating state.

On the other hand, if the static pressure-regulating valve 70 is controlled with the duty ratio D2 or the frequency f2, it makes the working air chamber 64 to have the average air pressure PSv-2, which is smaller than the average air pressure PSv-1 and the atmospheric pressure. As shown in FIG. 5, when the working air chamber 64 is exposed to the average air pressure PSv-2, the volume of the working air chamber 64 is made smaller in comparison with the case where the working air chamber 64 is exposed to the average pressure PSv-1 as shown in FIG. 4, and the case where the working air chamber 64 is exposed to the atmosphere as shown in FIG. 1. As a result, the connecting elastic body 16 is partially restricted with its more wide outer peripheral portion being held in contact with the mass member 14, making the natural frequency of the vibration system consisting of the mass member 14 and the connecting elastic body 16 higher in comparison with the case where the working air chamber 64 is exposed to the average air pressure PSv-1 as shown in FIG. 4.

Figure 6:
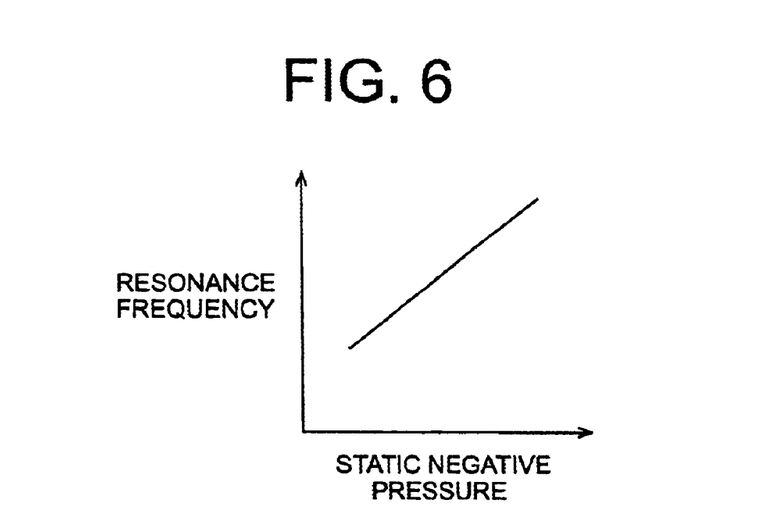
FIG. 6 is a graph suitable for explaining a relationship between a static negative pressure in a working air chamber and a resonance frequency of a vibration system in the active vibration damper of FIG. 1.
Figure 7:
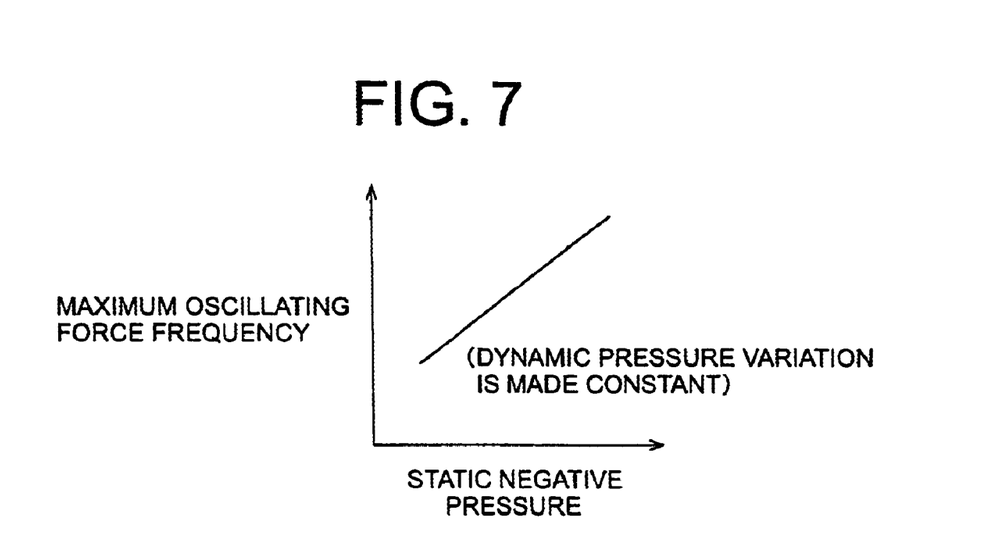
FIG. 7 is a graph suitable for explaining a relationship between the static negative pressure in the working air chamber and a frequency of a maximum oscillating force in the active vibration damper of FIG. 1.
Figure 8:
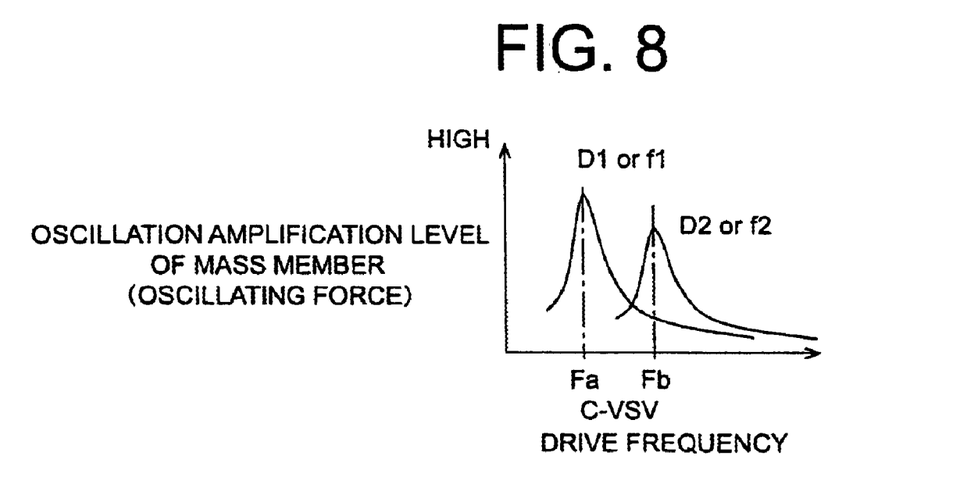
FIG. 8 is a graph suitable for explaining an example of a manner of control of active damping characteristic of the active vibration damper of FIG. 1.

That is, the active vibration damper 10 is capable of adjusting the value of the static pressure in the working air chamber 64 by controlling the duty ratio or frequency of the switching operation of the static pressure-regulating valve 70, while positively oscillating the mass member 14 by controlling the switching operation of the dynamic pressure-regulating valve 72. Therefore, the active vibration damper 10 is able to desirably change the natural frequency or the resonance frequency of its vibration system (i.e., the secondary vibration system), as shown in FIG. 6. This makes it possible to tune the resonance frequency of the vibration system of the active vibration damper 10 so as to correspond to the frequency of the dynamic or periodic change of the air pressure in the working air chamber 64 induced by the switching operation of the dynamic pressure-regulating valve 72, for example. In this case, as shown in FIGS. 7 and 8, the active vibration damper 10 permits a desired oscillation of the mass member 14 with highest efficiency, thus exhibiting a desired active vibration damping effect with high efficiency.

As is understood from the graph of FIG. 8, the active vibration damper 10 may be operated as follows by way of example: When the vehicle is in the idling condition, the switching operation of the static pressure-regulating valve 70 is controlled with the duty ratio D1 or the drive frequency f1 so that the resonance frequency of the vibration system of the active vibration damper 10 is tuned to an idling vibration frequency Fa. In this condition, the dynamic pressure-regulating valve 72 is continuously switched between its vacuum and atmospheric positions at the idling frequency Fa so as to induce a dynamic or periodic change of the air pressure in the working air chamber 64 at the idling frequency Fa. Thus, the active vibration damper 10 exhibits an excellent vibration damping effect with respect to the idling vibration excited in the vibrative body 36. On the other hand, when the vehicle is in the running condition, the switching operation of the static pressure-regulating valve 70 is controlled with the duty ratio D2 or drive frequency f2 so that the resonance frequency of the vibration system of the active vibration damper 10 is tuned to an booming noise frequency Fb. In this condition, the dynamic pressure-regulating valve 72 is continuously switched between its vacuum and atmospheric positions at the booming noise frequency Fb so as to induce a dynamic or periodic change of the air pressure in the working air chamber 64 at the booming noise frequency Fb. Thus, the active vibration damper 10 exhibits an excellent vibration damping effect with respect to the booming noise excited in the vibrative body 36.

Figure 9:
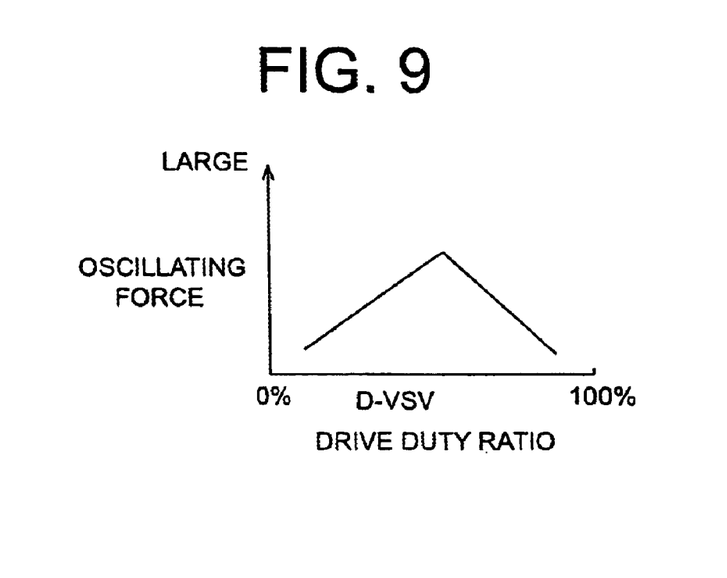
FIG. 9 is a graph suitable for explaining an example of a manner of control of the oscillating force of the active vibration damper of FIG. 1.

As shown in FIG. 9, the active vibration damper 10 is also capable of regulating a magnitude or amplitude of the oscillating force generated by the oscillation of the mass member 14, by controlling the duty ratio of the switching operation of the dynamic pressure-regulating valve 72 (i.e., a ratio of a time of connection of the working air chamber 64 to the said vacuum source 74, to a period of a switching operation of the dynamic pressure-regulating valve 72), for example. This makes it possible to adjust the oscillating force generated by the active vibration damper 10 by suitably regulating the duty ratio of the switching operation of the dynamic pressure-regulating valve 72 according to the magnitude of the vibration excited in the vibrative member 36, resulting in a further improved vibration damping effect of the active vibration damper 10. As is understood from the foregoing description, the static pressure-regulating valve 70 and the C-VSV drive circuit 84 cooperate to constitute a static pressure-regulating system, while the dynamic pressure-regulating valve 72 and the D-VSV drive circuit 82 (D-VSV) cooperate to constitute a dynamic pressure-regulating system, in the present embodiment.

Figure 10:
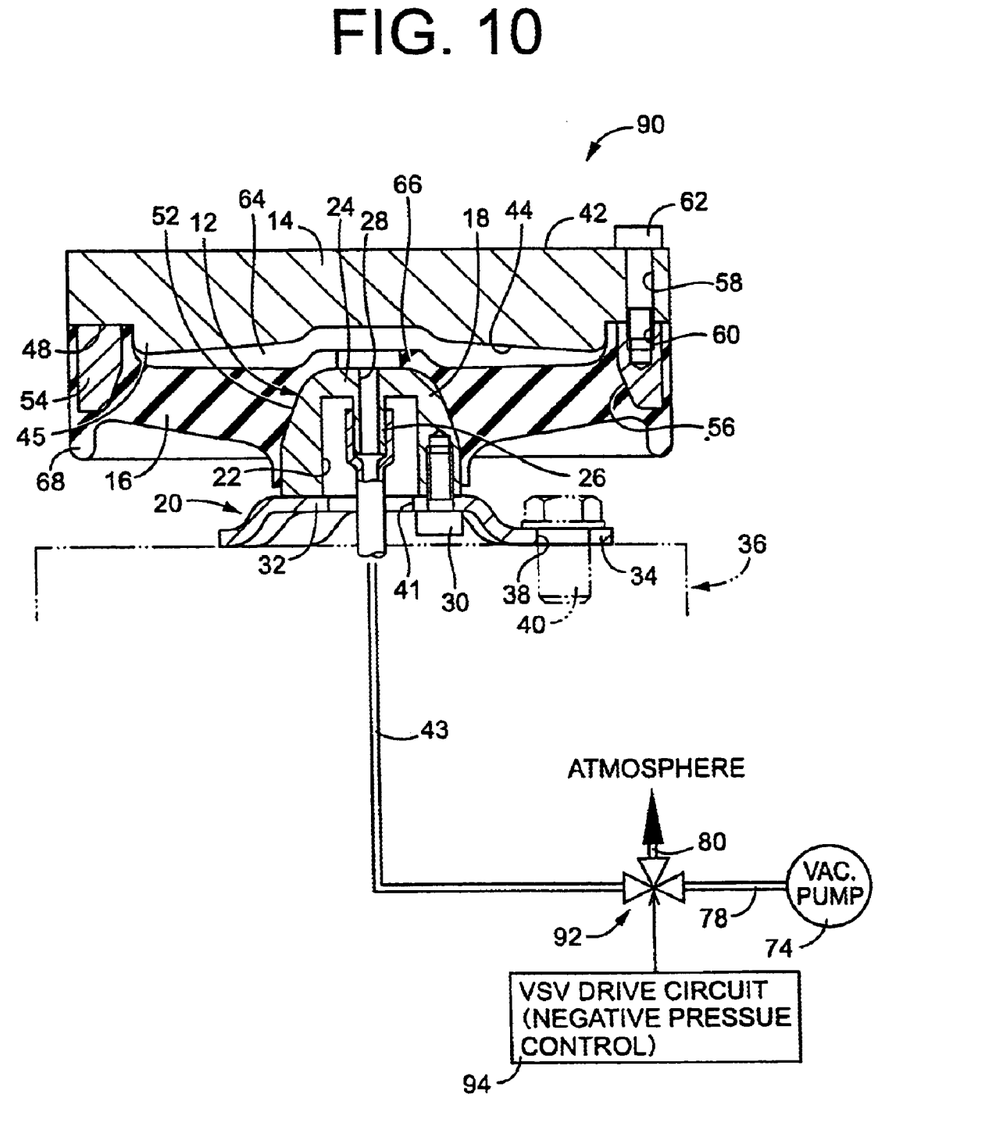
FIG. 10 is an elevational view in vertical cross section of a pneumatically controlled vibration damper in the form of a passive vibration damper constructed according to a second embodiment of the invention, where the passive vibration damper is in one of its operating states.

Referring next to FIG. 10, there is shown a passive vibration damper 90 constructed according to a second embodiment of a pneumatically controlled vibration damper of the invention, together with a drive system used for driving the passive vibration damper 90. The same reference numerals as used in the first embodiment will be used in this second embodiment to identify the functionally corresponding or structurally similar elements, which will not be described in detail to avoid redundancy of description.

In the passive vibration damper 90, the lower surface of the mass member 14 has a profile corresponding to that of the upper surface of the connecting elastic body 16, which is opposed to the lower surface of the mass member 14 in the vibration input direction with a given axial spacing.

The port 26 is held in communication with a static pressure-regulating valve 92 through the external air conduit 43. This static pressure-regulating valve 92 may consist of a three-part (three-way) solenoid-operated switch valve of spool or rotary type, and is operable alternatively connect the working air chamber 64 to the vacuum source 74 and the atmosphere. Described in detail, the static pressure-regulating valve 92 has a vacuum position for connecting the working air chamber 64 to the vacuum source 74 through the external air conduit 43, and an atmospheric position for connecting the working air chamber 64 to the atmosphere through the external air conduit 43. This static pressure-regulating valve 92 is operated under control of a VSV drive circuit 94. In this embodiment, the static pressure-regulating valve 92 and the VSV drive circuit 94 cooperate to constitute a static pressure-regulating system.

With the static pressure-regulating valve 92 placed in its atmospheric position for exposing the working air chamber 64 to the atmosphere, the mass member 14 is spaced apart from the connecting elastic body 16 over a substantially entire lower surface area as shown in FIG. 10, so that the working air chamber 64 has a relatively large volume. On the other hand, with the static pressure-regulating valve 92 placed in its vacuum position for exposing the working air chamber 64 to the vacuum source 74, the mass member 14 and the connecting elastic body 16 are superposed on each other as shown in FIG. 1, whereby the working air chamber 64 is defined by a slight gap formed between the mass member 14 and the connecting elastic body 16 at their outer circumferential portions.

Figure 12:
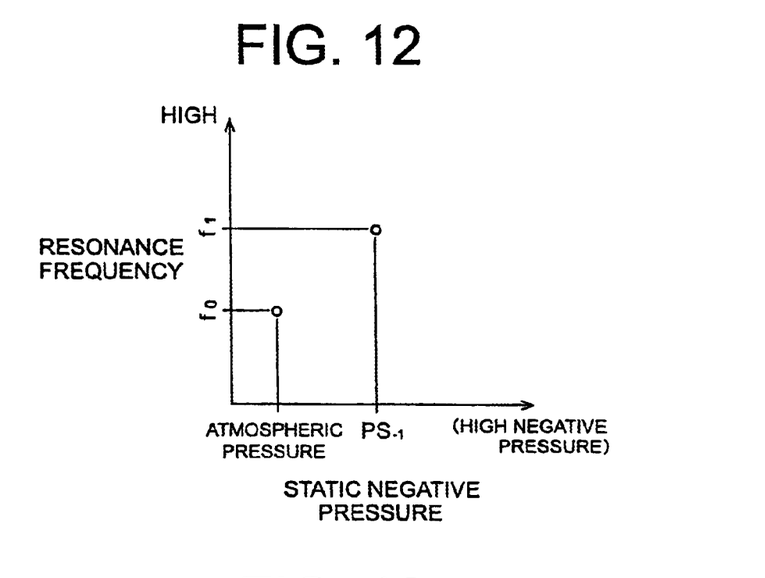
FIG. 12 is a graph suitable for explaining a relationship between a static negative pressure in a working air change and a resonance frequency of a vibration system in the passive vibration damper of FIG. 10.

Referring to the graph of FIG. 12, when the working air chamber 64 is connected to the vacuum source 74 having a negative pressure value PS-1, the lower surface of the mass member 14 is held in abutting contact at its central portion with the elastic projection 66 so that the mass member 14 is directly elastically supported by the mounting member 12 via the elastic projection 66 secured to the upper surface of the mounting member 12. In this condition, the natural or resonance frequency f1 of the vibration system constituted by the mass member 14 and the connecting elastic body 16 is made higher than the natural or resonance frequency f0 of the vibration system under the condition where the working air chamber 64 is connected to the atmosphere.

For the above-indicated features of the passive vibration damper 90, the passive vibration damper 90 may be tuned such that the vibration system consisting of the mass member 14 and the connecting elastic body 16 has the natural frequency f0 corresponding to the frequency of the engine idling vibration with the working air chamber 64 connected to the atmosphere, and has the natural frequency f1 corresponding to the frequency of the booming noise with the working air chamber 64 connected to the vacuum source 74, by way of example. In operation, the static pressure-regulating valve 92 is controlled to be placed in its atmospheric position for connecting the working air chamber 64 to the atmosphere when the vehicle is in the idling condition, and to be placed in its vacuum position for connecting the working air chamber 64 to the vacuum source 74 when the vehicle is in the running condition. Hence, the passive vibration damper 90 is capable of exhibiting an excellent passive damping effect with respect to both of the engine idling vibration and the booming noises excited in the vibrative member 36 (e.g., a body of the vehicle) during the respective idling condition and the running condition of the vehicle, with the help of the resonance effect of its vibration system as the second vibration system.

While the present invention has been described in its presently preferred embodiments, it is to be understood that the invention is not limited to the details of the illustrated embodiments, but may be otherwise embodied.

Figure 11:
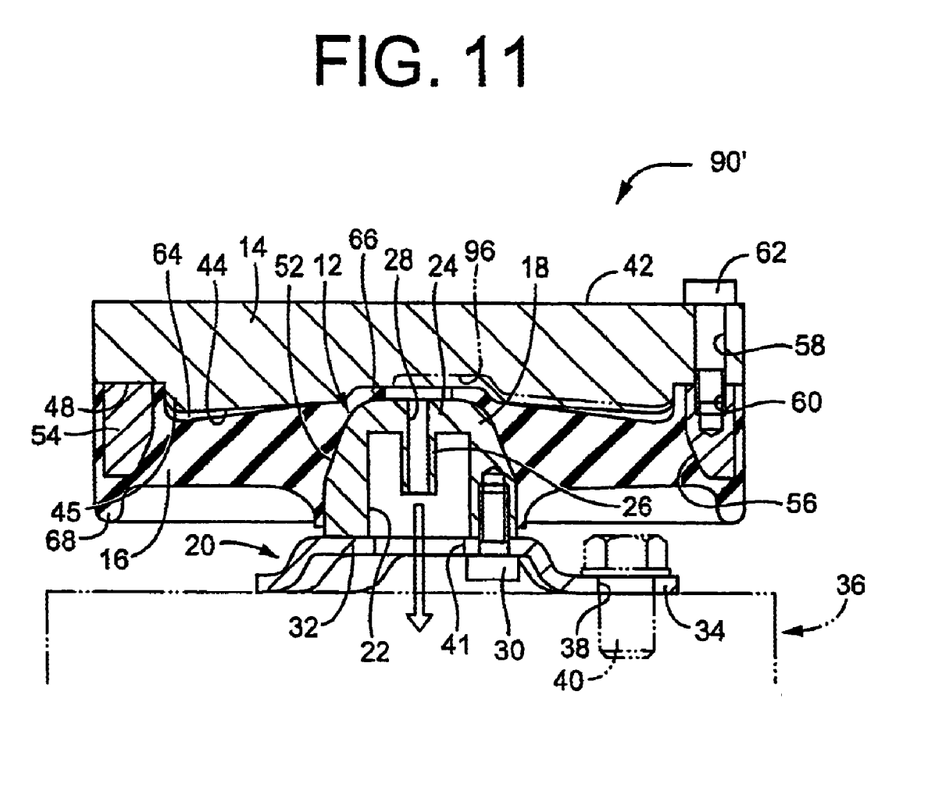
FIG. 11 is an elevational view in vertical cross section of the passive vibration damper of FIG. 10 where the passive vibration damper is in the other of its operating states.
Figure 13:
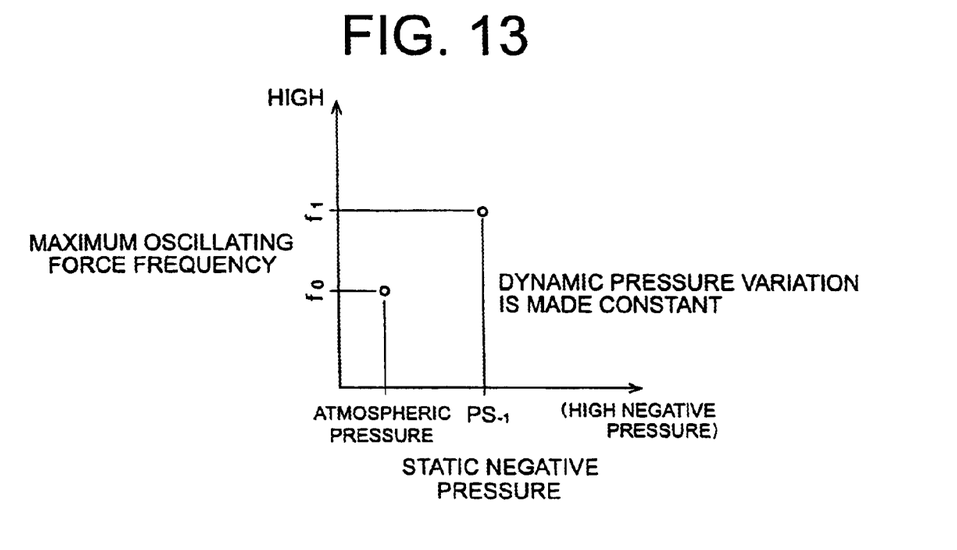
FIG. 13 is a graph suitable for explaining a relationship between the static negative pressure in the working air chamber and a frequency of a maximum oscillating force in the passive vibration damper of FIG. 10, where the passive vibration damper is applied to as an active vibration damper.

In the illustrated second embodiment, the principle of the present invention is applied to one example of a passive-type vibration damper in the form of the passive vibration damper 90. The illustrated passive vibration damper 90 may be otherwise modified. For example, the passive vibration damper 90 may employ a dynamic pressure-regulating valve operable for alternately connecting the working air chamber 64 to the atmosphere and the vacuum source 74 at a frequency corresponding to that of vibration to be damped in place of the static pressure-regulating valve, and a pressure-regulating device for regulating the negative pressure in the vacuum source 74. In this arrangement, the passive vibration damper 90' may constitute one example of an active-type vibration damper similar to the active vibration damper 10 of the first embodiment. Namely, the modified passive vibration damper 90' is capable of changing a frequency of the maximum oscillating force generated by the periodic change of the air pressure in the working air chamber 64 according to the value of the static air pressure applied to the working air chamber 64, as shown in the graph of FIG. 13. Like the active vibration damper 10 of the first embodiment, the modified passive vibration damper 90' is capable of exhibiting a desired active vibration damping effect with respect to a plurality of vibration frequency bands. Where the modified passive vibration damper 90' is used as an active-type vibration damper of the present invention, the mass member 14 is formed with a communication groove 96 open in its lower surface and continuously extending between its central and its peripheral portion as indicated by a two-dot chain line in the mass member 14 of FIG. 11. The presence of the communication groove 96 assures a generation of the periodic change of the air pressure in the working air chamber 64 even where the mass member 14 and the connecting elastic body 16 are held in contact with each other.

Where the modified passive vibration damper 90' is used as an active-type vibration damper of the present invention, a static air pressure value in the working air chamber 64 may possibly be controlled according to the PWM control or the frequency control of another dynamic pressure-regulating valve operated at a higher frequency, while the dynamic pressure-regulating valve is operated at a controlled frequency corresponding to a frequency of the vibration to be damped.

In the active vibration damper 10 according to the first embodiment, the static pressure-regulating valve 70 connected to the portion of the second branch conduit 80 for connecting the dynamic pressure-regulating valve 72 and the atmosphere. It may be possible to connect the static pressure-regulating valve 70 to a portion of the first branch conduit 78 for connecting the dynamic pressure-regulating valve 72 and the vacuum source 74. This arrangement may enjoy the same advantages of the first embodiment, namely the average value of the air pressure in the working air chamber 64 can be regulated by controlling the switching operation of the static pressure-regulating valve 70 according to the duty ratio control or the drive frequency control.

While the illustrated embodiments show the use of the atmosphere and a vacuum source available on any motor vehicle having an internal combustion engine, as required air pressure sources. The present invention may be embodied by utilizing any other two or more air pressure sources whose pressure values are different from each other. For instance, a positive pressure having a pressure value higher than that of the atmospheric pressure may be employed.

The manner of control of the air pressure in the working air chamber 64 is not particularly limited by the details of the illustrated embodiment. For instance, the illustrated active vibration damper 10 may further includes a pressure sensor for detecting the air pressure in the working air chamber 64 and an acceleration sensor for detecting an amount of oscillating force acts on the vibrative member 36 or condition of vibration excited in the vibrative member 36 or other available sensors, so that the active vibration damper 10 is able to regulate the oscillating force generated by the oscillation of the mass member 14 in a feedback control manner, by using control signals generated from these sensors.

While the dynamic or periodic air pressure change having a frequency corresponding to the frequency of the vibration to be damped is applied to the working air chamber 64 in the active vibration damper 10 of the first embodiment, it may be possible to form an another air chamber for inducing the dynamic air pressure change. For instance, the active vibration damper 10 may be modified to have a movable member partially defining the working air chamber on one of opposite side thereof, and an oscillating chamber on the other side thereof. The controlled dynamic air pressure change is applied to the oscillating chamber through an oscillating air passage open in the oscillating air chamber, so that the mass member is oscillated at a frequency corresponding to the frequency of the vibration to be damped.

Although the pneumatically controlled vibration dampers in the form of the active and passive vibration dampers for automotive vehicles have been described above by way of example, it will be understood that the principle of this invention is equally applicable to other vibration dampers not used for automotive vehicles but used for any other devices.

It is also to be understood that the present invention may be embodied with various other changes, modifications and improvements, which may occur to those skilled in the art, without departing from the spirit and scope of the invention defined in the following claims.

What is claimed is:

1. A pneumatically controlled vibration damper for damping vibration of a subject member as a primary vibration system, said vibration damper comprising:
   a mounting member adapted to be fixed to the subject member;
   a mass member disposed spaced apart from said mounting member and displaceable relative to said mounting member;
   an elastic connector secured to said mounting member and said mass member for elastically connecting said mass member to said mounting member so that said elastic connector and said mass member cooperate to form a secondary vibration system;
   a working air chamber partially defined by said elastic connector and closed from an external area;
   an air passage connected to said working air chamber for regulating an air pressure in said working air chamber from said external area;
   a static pressure-regulating system operable for substantially statically regulating said air pressure in said working air chamber via said air passage, so as to induce a substantially static elastic deformation of said elastic connector for changing a spring characteristic of said elastic connector; and
   at least one abutting projection formed on an inner surface of said working air chamber such that said at least one abutting projection protrudes from at least one toward an other of said elastic connector and an abutting portion of said inner surface of said working air chamber, said abutting portion being opposed to said elastic connector, wherein said static pressure-regulating system is operable to regulate said air pressure in said working air chamber so that said abutting projection is brought into abutting contact with said elastic connector or said abutting portion of said inner surface opposed to said elastic connector for applying a restricting force to said elastic connector.

2. A pneumatically controlled vibration damper according to claim 1, wherein said static pressure-regulating system is operable to substantially statically change said air pressure in said working air chamber by applying a substantially static air pressure having a pressure value selected from a predetermined range according to a frequency of said vibration to be damped so that a spring characteristic of said elastic connector become harder as a frequency of said vibration to be damped become higher.

3. A pneumatically controlled vibration damper according to claim 1, wherein said static pressure-regulating system is operable to apply to said working air chamber a substantially static air pressure whose value is changed between or among a predetermined different static pressure values according to a change in a frequency of said vibration to be damped so that a spring characteristic of said elastic connector is gradually changed.

4. A pneumatically controlled vibration damper according to claim 1, wherein said mounting member and said mass member are opposed to and spaced apart from each other in a vibration input direction in which said vibration damper primary receives a vibrational load to be damped, wherein said elastic connector comprises a connecting elastic body that extends outwardly from said mounting member in a direction perpendicular to said vibration input direction and is bonded at an outer peripheral portion thereof to said mass member so that said connecting elastic body primary undergoes shear deformation thereof upon a displacement of said mass member in said vibration input direction, and wherein said working air chamber is disposed between a surface of said mass member and a surface of said connecting elastic body that is opposed to said surface of said mass member in said vibration input direction.

5. A pneumatically controlled vibration damper according to claim 1, wherein said air passage is formed through said mounting member.

6. A pneumatically controlled vibration damper according to claim 1, wherein said vibration damper constitutes a vibration damper for an automotive vehicle, and a natural frequency of said secondary vibration system constituted by said elastic connector and said mass member is tuned to a low frequency band corresponding to engine idling vibration when said static pressure-regulating system operates to apply an atmospheric pressure to said working air chamber, and to a high frequency band corresponding to booming noises when said static pressure-regulating system operates to apply a static air pressure other than said atmospheric pressure to said working air chamber.

7. A pneumatically controlled vibration damper according to claim 1, further comprising a dynamic pressure-regulating system that is operable to apply to said working air chamber a dynamic air pressure change having a frequency corresponding to a frequency of said vibration to be damped so as to actively oscillate said mass member.

8. A pneumatically controlled vibration damper according to claim 7, wherein said dynamic air pressure change generated by said dynamic pressure-regulating system is applied to said working air chamber together with a substantially static air pressure change generated by said static pressure-regulating system.

9. A pneumatically controlled vibration damper according to claim 7, wherein said dynamic pressure-regulating system includes a first switch valve operable for alternately connecting said working air chamber to a vacuum source and the atmosphere at a frequency corresponding to a frequency of said vibration to be damped, and a first duty ratio regulating system operable for regulating a duty ratio of a control signal applied to said first switch valve according to said vibration to be damped, said first duty ratio regulating system changing a ratio of a time of connection of said working air chamber to said vacuum source, to a period of a switching operation of said first switch valve so as to regulate an amplitude of said dynamic air pressure change having said frequency corresponding to said frequency of said vibration to be damped, which is applied to said working air chamber.

10. A pneumatically controlled vibration damper according to claim 9, wherein said static pressure-regulating system includes a second switch valve operable for alternately opening and closing a communication of said working air chamber with said atmosphere through said first switch valve at a relatively high frequency, and a second duty ratio regulating system operable for regulating a duty ratio of a control signal applied to said second switch valve according to said frequency of said vibration to be damped, said second duty ratio regulating system changing a ratio of a time of opening to a period of a switching operation of said second switch valve so as to regulate a value of a static air pressure applied to said working air chamber.

11. A pneumatically controlled vibration damper according to claim 1, further comprising: an oscillating member partially defining said working air chamber on one of opposite sides thereon and an oscillating air chamber on an other of said opposite sides thereof; and a dynamic pressure-regulating system that is operable to apply a dynamic air pressure change having a frequency corresponding to a frequency of said vibration to be damped to said oscillating air chamber through a oscillating air passage connected to said oscillating air chamber.

* * * * *